United States Patent [19]

Hodgson, Jr.

[11] Patent Number: 4,484,636
[45] Date of Patent: Nov. 27, 1984

[54] LEVEE PLOW WITH EXTENSIBLE LINKAGE

[75] Inventor: Emory R. Hodgson, Jr., Yazoo City, Miss.

[73] Assignee: Dynamics Corporation of America, Greenwich, Conn.

[21] Appl. No.: 297,255

[22] Filed: Aug. 28, 1981

[51] Int. Cl.³ .................... A01B 13/02; E02F 5/22
[52] U.S. Cl. .................... 172/454; 172/477; 172/583; 172/587; 172/701; 403/109
[58] Field of Search .............. 172/149, 178, 440, 441, 172/442, 446, 447, 454, 455, 459, 476, 477, 574, 576, 580, 582, 583, 584, 587, 591, 592, 596, 645, 647, 649, 651, 652, 654, 655, 815, 831, 701; 403/109; 91/520

[56] References Cited

U.S. PATENT DOCUMENTS 2,213,471 9/1940 Minnick .................... 403/109 X
3,275,087 9/1966 Petitt .................... 172/582 X
3,476,016 11/1969 Dixon et al. .................... 91/520

FOREIGN PATENT DOCUMENTS 1026288 2/1953 France .................... 172/654

OTHER PUBLICATIONS

Athens Series, "160", Tool Bar Levee Harrow Brochure.
Blanton, "Levvee Master", Dyke Plow Model No. 700.
Dell Model 1200 Levee Devil Levee Disc.
Midland R 808 Levee Plow.
Rome 3 Point Lift Rice Levee Harrow, Series TPW.
Rayne Plane Levee & Terracing Plows.
Delta King Levee Disk Plow.
W & A Levee Plow.
Forrest City Hydraulically Operated Levee Plow.

Primary Examiner—Richard T. Stouffer
Attorney, Agent, or Firm—Schroeder, Siegfried, Vidas & Arrett

[57] ABSTRACT

A tractor-drawn levee plow having a telescoping frame pivotally supporting a pair of harrow-gangs arranged to move soil laterally toward each other to a center-line to form the levee, the frame also pivotally supporting a pair of hydraulic cylinders powered by the tractor and connected in fluid-power series, one each of which is pivotally connected to the outer end portion of one of the gangs and each of which is utilized in practicing a new method involving forcibly holding the outer portion of its gang in elevated and/or depressed relation to its inner end portion while in ground-engaging position to thereby most effectively and efficiently construct a levee.

17 Claims, 6 Drawing Figures

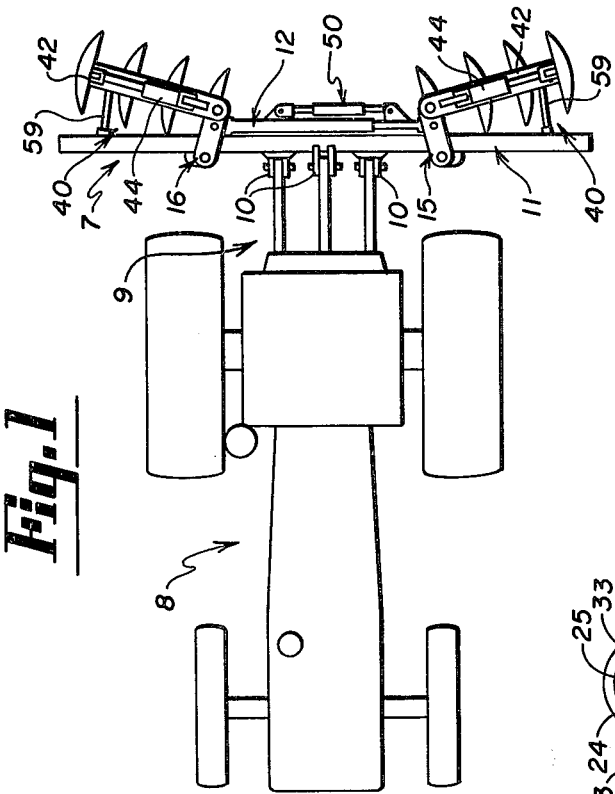
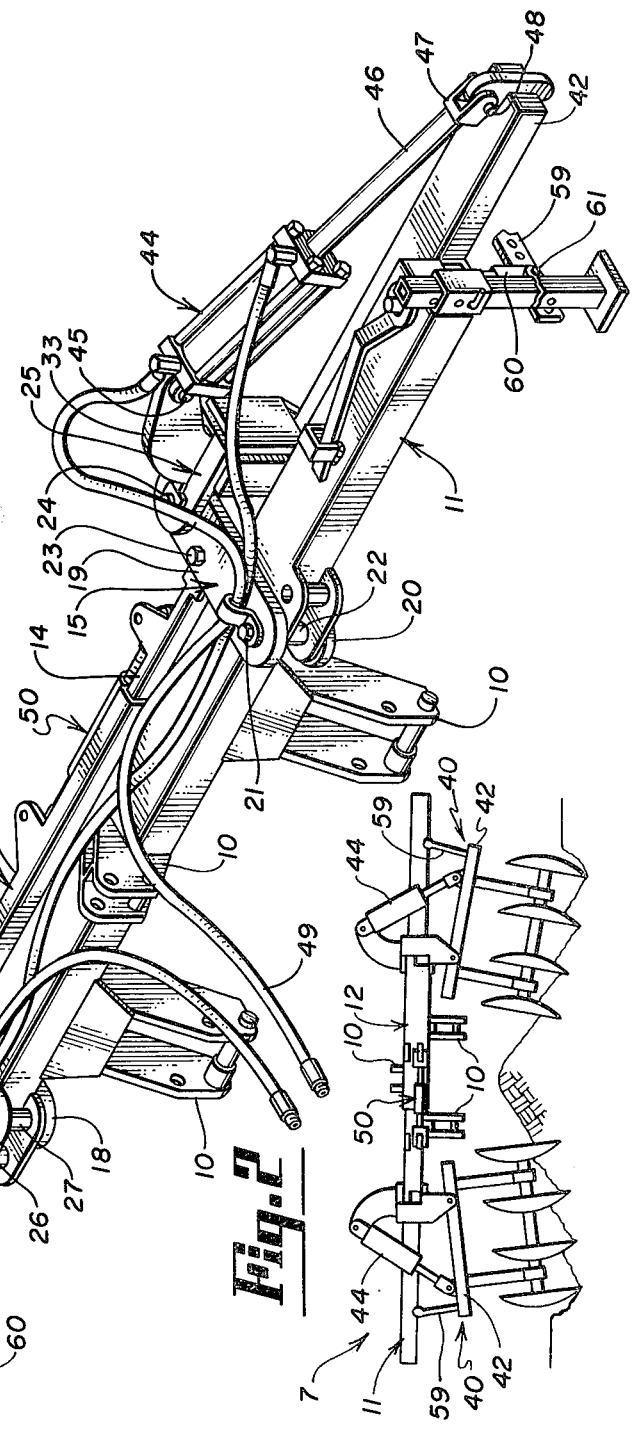
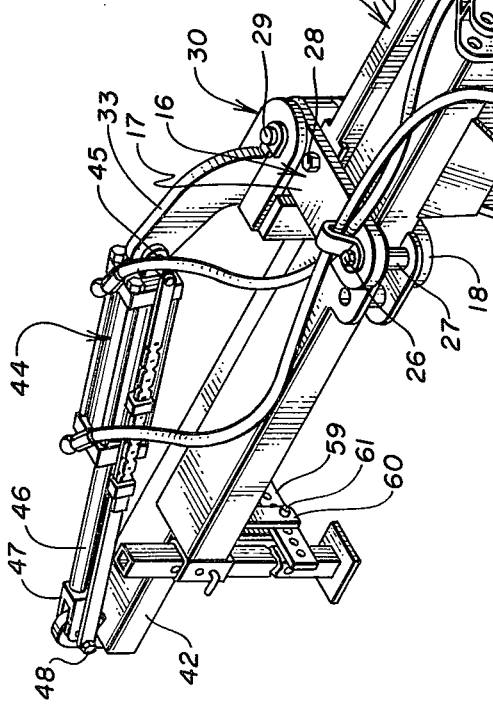

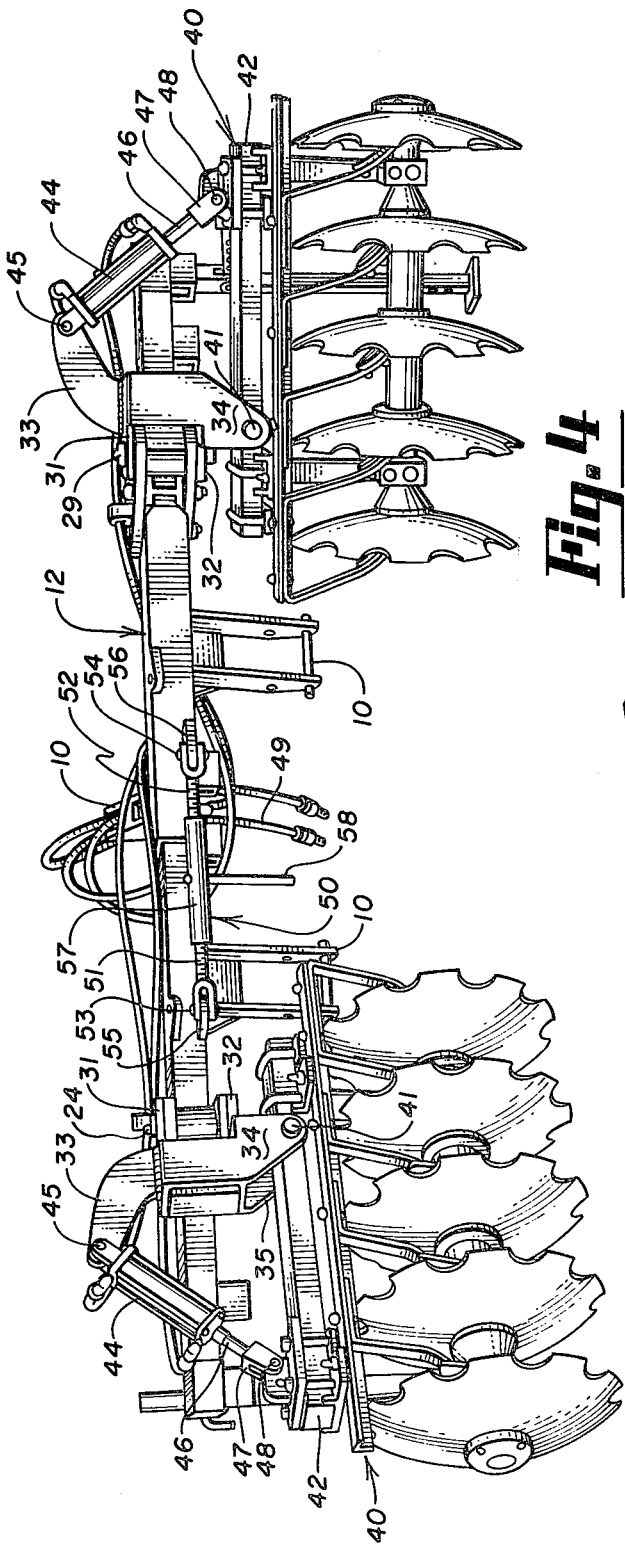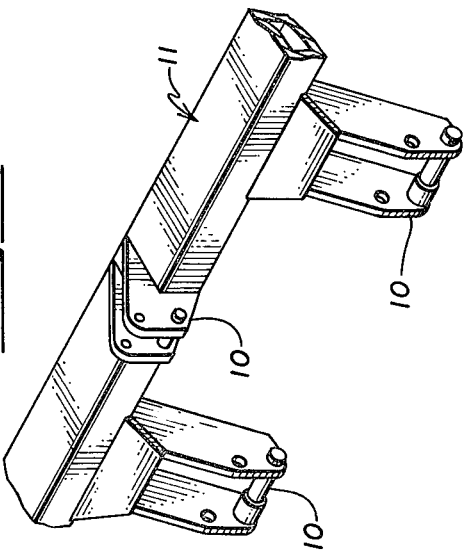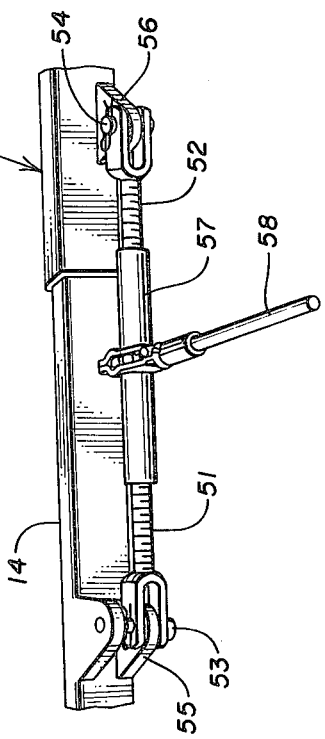

under the plots covered at patent 4,484,636

LEVEE PLOW WITH EXTENSIBLE LINKAGE

DESCRIPTION

1. Background of Prior Art

Conventional means for constructing levees involves the use of bull-dozers and/or other earth moving equipment which is very expensive to own and operate and requires an undue amount of time for the actual construction. Some attempts have previously been made to construct levees through the use of disk or harrow plows, but here again, an undue amount of time, effort and expense has been involved because an excessive number of trips or passes over the field have been required and after a number of passes have been made, such implements tend to become relatively ineffective because they cease to effectively move the soil laterally to a higher grade or level. As a consequence, the building cost for levees has been excessive with respect to time, equipment, fuel, and money.

In addition, problems encountered in the use of disk or harrow plows have included difficulty in getting each gang to penetrate and move the soil to the same extent and the impossibility of adjusting such depth while the equipment is moving. As a consequence, much time is lost and much frustration as well as undesirable results have been experienced. My invention obviates these problems.

2. Brief Description of the Invention

I have provided a levee plow in which the harrow-gangs are mounted on a tubular frame which is extensible or contractible and thus can bring soil centrally from a wider than normal area. Hydraulic cylinders connected in series fluid-flow relation insures that the individual horrow-gangs are depressed to exactly the same extent, and permits vertical adjustment of some while in motion. Through the use of such cylinders, the outer ends of the gangs may be maintained in slightly elevated relation to inner end portions to cause the latter to more effectively initiate the construction of the levee, in the initial pass of the plow, by forming a narrow steep-sloped core. The cylinders make it possible to forcibly depress and maintain the outer end portions at an ever-increasing lower level as subsequent passes are made, to thereby more effectively move the soil to the center line of the levee being built. By forcibly holding the outer end portions in fixed depressed relation, the harrows are forced to cut through all contour irregularities of the soil and eliminate same. Fewer passes are required and a better and a steeper sloped levee is provided at reduced expense.

BRIEF DESCRIPTION OF THE DRAWINGS

A detailed description of one preferred embodiment of the levee plow is hereafter described with specific reference being made to the drawings in which:

FIG. 1 is a top plan diagrammatic view of my new levee plow being drawn by a tractor;

FIG. 2 is a simplified rear elevational diagrammatical view of the plow only;

FIG. 3 is a perspective diagrammatical view of the plow on a larger scale as viewed from the rear;

FIG. 4 is a fragmentary perspective view of the transverse frame and its couplings for attachment to a conventional tractor three-way hitch;

FIG. 5 is a fragmentary perspective view from the rear of the threaded adjustment mechanism of the telescoping tubular frame which supports the harrow-gangs; and FIG. 6 is a rear perspective diagrammatic view of my plow shown detached from the tractor and on parking stands.

DETAILED DESCRIPTION OF INVENTION

The preferred embodiment of my invention is shown in FIGS. 1-6 inclusive. As shown, it includes a levee plow indicated generally by the number 7 which is constructed and arranged to be drawn by a tractor 8. The tractor 8 has a conventional three point hitch 9 by means of which it is connected to the plow 7 through three couplings 10 which are provided for that purpose and are best shown in FIG. 6. These three couplings are carried by an elongated transverse rigid frame 11 by means of which the plow 7 is elevated and lowered between elevated non-operative and a non-engaging position and lowered, operative, engaging position with respect to the ground.

Pivotally mounted upon the frame 11 and extending parallel thereto is an extensible and contractable tubular frame 12 which includes a pair of telescoping tubular sections 13 and 14. As best shown in FIG. 6, this tubular frame 12 includes a pair of mounting plates 15 and 16 by means of which it is pivotally mounted on the frame 11.

Each pair of mounting plates 15 and 16 includes a pair of vertically spaced pivot plates such as indicated by the numerals 17, 18 and 19, 20. Pivot plates 19, 20 are pivotally connected to the frame 11 by pivot pin 21 which extends therethrough and is received in pivot bearing 22 provided for that purpose on frame 11. Tubular pin 23 pivotally connects the outer end of the tubular section 14 to pivot plates 19 and 20 and pivot pin 24 pivotally mounts mounting bracket 25 upon the rear end of the pivot plates 19 and 20. This can best be seen in FIG. 6.

Similarly, pivot pin 26 pivotally mounts pivot plates 17 and 18 upon frame 11 and extends through pivot bearing 27. Pivot pin 28 extends through each of the plates and the outer end of tubular section 13 and pivot pin 29 pivotally connects the rear end of the two plates to mounting bracket 30, all as shown in FIG. 6.

Each of the mounting brackets 25 and 30 includes a pair of vertically spaced inwardly extending plates such as indicated by the numerals 31 and 32. Each also includes an upwardly and outwardly extending support arm 33 and a pair of depending mounting ears 34,35. Each of said brackets pivots about its respective pivot pin 24, 29. Each of the brackets have been numbered accordingly.

Each of said brackets 25 and 30 pivotally support a gang disk harrow such as indicated generally by the numeral 40. Each of said harrows is pivotally mounted on the pair of ears 34 and 35, as best shown in FIG. 3, for vertical movement about a horizontal pivot pin 41 which extends through the frame 42 of the gang at a point a substantial distance inwardly of the inner end of the frame.

The inner end of a cylinder such as indicated by the numeral 44 is pivotally mounted on the outer end of each of the support arms 33 by means of pin 45. Rod end 46 of the cylinder carries a yoke 47 and a pin 48 by means of which it is connected to the extreme outer end of the gang frame 42. This can best be seen in FIG. 3.

Each of the cylinders 44 is a double acting rephasing cylinder and is connected in series fluid-power relation by hydraulic tubes 49, as shown in FIG. 6. Thus, when the cylinders are to be extended, fluid is caused to enter the head of one of the cylinders, as shown at the right in FIG. 6, which causes the fluid at the opposite and outer end to be conveyed by one of the tubes 49 to the head of the other cylinder. The oil at the outer end of the receiving cylinder is returned to the reservoir of the tractor, the hydraulic power take-off of which is connected to the tubes 49 and the power controls of which are utilized to control the flow of hydraulic fluid through the hoses 49. Of course, when the cylinders are to be contracted, the direction of flow is reversed. This series-flow connection assures that the same pressure will be applied by each of the cylinders 44 and consequently there is an equal extension of the cylinder rods and the same downward pressure is applied to each of the opposed gangs. It will be noted that each of the gangs is constructed and arranged so as to move the soil laterally toward the center line of the levee to be constructed as illustrated in FIG. 2.

A threaded mechanism 50, similar in construction to a turnbuckle, is pivotally connected to the telescoping sections 13 and 14 of the tubular frame 12. As best shown in FIG. 6, this mechanism 50 includes a pair of externally threaded shafts 51 and 52 which are pivotally connected by pins 53, 54 to a pair of pivot ears 55 and 56, one each of which is carried by one of the tubular sections. An internally threaded tube 57 threadedly receives the two shafts 51, 52 and is turned thereabout by means of a crank rod 58. The two threaded shafts 51 and 52 are oppositely threaded so that rotation of the tube 57 by means of the crank 58 will cause the tubular frame to extend or contract, depending upon the direction of rotation of the tube 57.

As shown in FIGS. 1, 2 and 6 the outer end of each of the harrow-gangs 42 is connected by an adjustable link 59 to the frame 11 by depending straps 60 and a pin 61.

It will be readily seen that my levee plow can be readily moved between ground-engaging operative position and non-engaging non-operative position by the tractor 8 through manipulation of its 3 point hitch 9, as is conventional. However, my levee plow makes it possible to utilize the disk harrows 40 in a more effective manner, for during the initial pass of the tractor along the center line of the levee to be built, the outer end portion of the two gang harrows 40 can be elevated by manipulation of the cylinders 44 relative to its inner end, thereby causing the innermore individual disks of the two harrows to operate more effectively on the soil immediately adjacent the center line. On the second pass over the center line, the cylinders 44 are extended so that the outer end portions of each are forcibly held at an elevation below the inner portion of the gang, thereby more effectively moving the soil laterally to the centerline. If needed, depending upon the desired height of the levee, additional passes may be made over the centerline with the cylinders 40 further extended and forcibly held at a still lower elevation with each succeeding pass, thereby producing a very narrow base levee with steep side slopes in a minimum amount of time and with a minimum expenditure of fuel.

It should be noted that through the use of a series fluid power connection, each of the outer ends of the gangs 40 are forcibly held in a depressed position in the second and subsequent passes by the same pressure and to the same extent. If an uneven contour of soil is encountered, that uneven contour will be reduced and eliminated as a result of the unyielding corresponding and same positions at which these gangs are held. Of equal importance, is the fact that through the use of hydraulic cylinders and series fluid-power connections, the elevation of the outer end of the disk harrows can be changed while the tractor is in motion, with complete assurance that the adjustments made will be equal with respect to each of the harrows. This is not possible with equipment heretofore known. Such adjustments make it possible to save a substantial amount of time when such changes are required. It also makes it possible to be assured that the extent of adjustment is always equal. Since the adjustment is unyielding, the net resulting effects are the same. As a consequence, a better, more even, levee is produced which, of course, is highly desirable particularly when grains such as rice is to be planted and grown on the levee itself.

If a broader levee is desired, it is possible to produce such a levee with my levee plow by simply extending the tubular frame 12. This can be accomplished by rotation of the tube 57 through the use of the crank 58 so as to cause the tubular frame to extend. Extension of the frame 12 obviously causes the pivot pins 23 and 28 to be moved outwardly away from each other, thereby causing pivot plates 19, 20 and 17, 18 to swing outwardly about the axis of their pivot pins 21, 26 by means of which they are mounted on the frame 11. This causes each of the mounting brackets 25 and 30 to be swung outwardly and to correspondly move the two harrow-gangs 40 outwardly away from each other. Thus, with a single piece of equipment, and with minor adjustments thereto it is now possible to build levees of different widths and of different slopes as desired, thereby effectuating substantial savings in capital outlay for equipment and in time and expense involved in producing same.

The cylinders 44 are preferably of the type described in U.S. Pat. No. 3,666,284 but may be of the type described in the other U.S. Patents identified therein with respect to cylinder construction. Since they are connected in series, they differ somewhat in size so as to compensate for the differences in effectual cross-sectional areas of the rod side and the anchored end side of the pistons to thereby insure equal movement of the pistons. The cylinders 44 also preferably include the fluid by-passes and adjustable abutments for extension as described and shown in U.S. Pat. No. 3,666,284.

In considering this invention it should be remembered that the present disclosure is illustrative only and the scope of the invention should be determined by the appended claims.

I claim:
1. A levee plow comprising:
 (a) an elongated transverse harrow-gang-supporting frame constructed and arranged to be connected to and supported by a tractor to extend transversely therebehind and to be moved thereby between gang-elevating non-operative position and gang-lowering operative position;
 (b) a tubular frame having a pair of telescoping tubular sections, each of which has outer end portions pivotally mounted upon said transverse frame for pivotal movement about a vertical axis;
 (c) a pair of laterally spaced harrow-gangs, each having inner and outer end portions and being pivotally mounted adjacent its inner end portions upon one of said tubular frame sections for lateral swinging movement toward and away from each other as said tubular sections are moved telescopically relative to each other;

(d) the harrows of each of said gangs being arranged to move the soil traversed thereby laterally toward the other of said gangs;

(e) mechanical means extending between and connected to each of said tubular frame sections and being constructed and arranged to controllably move the same telescopically with respect to each other to extend and contract said frame; said mechanical means comprising an extensible linkage extending parallel to said tubular frame sections with one end of said linkage mounted on an exterior surface of one of said tubular frame sections and the other end of said linkage mounted on an exterior surface of the other one of said tubular frame sections;

(f) a pair of hydraulic cylinders constructed and arranged to be powered by the tractor when said transverse frame is so connected thereto, one each of said cylinders being pivotally connected at one of its ends to one of said tubular frame sections at an elevated location with respect thereto, and at its other end to the extreme outer end portion of one of said gang harrows;

(g) said cylinders being constructed and arranged to be controlled from the tractor when connected thereto, and being connected in series fluid-power relation with each other; and (h) said cylinders being constructed and arranged so that when extended, they will each force and hold the outer end portion of its associated gang harrow at a substantially lower elevation than its inner end portion.

2. The structure defined in claim 1, wherein said tubular frame includes a pair of pivotal mounting means, one each of which is pivotally connected at its medial portions to the outer end portions of one of each of said tubular sections and is pivotally mounted at one of its end portions upon said transverse frame and pivotally supports at its opposite end portion one of said harrow-gangs.

3. The structure defined in claim 1, wherein said cylinders are also constructed and arranged to force and hold the outer end portions of each of said gangs in an elevated position relative to its inner end portion while said gangs are in operative ground-engaging positions.

4. The structure defined in claim 1, wherein each of said harrow-gangs is pivotally mounted upon said telescoping frame at a point a substantial distance outwardly from the extreme inner end of said gang.

5. The structure defined in claim 1 wherein said mechanical means comprises threaded adjustment mechanism extending between said tubular frame sections and connected thereto and causing the same to telescope relative to each other and thereby move said harrow-gangs toward or away from each other as said threaded mechanism is adjusted.

6. The structure defined in claim 1, wherein said tubular frame includes two pairs of vertically spaced opposed pivot plates, each pair of which is pivotally secured at their medial portions to the outer end portion of one of said tubular sections, each pair of said pivot plates being pivotally connected to said transverse frame for free pivotal movement about a vertical axis and also being pivotally connected to and supporting the inner end portion of one of said gangs for swinging movement thereof about a vertical axis.

7. The structure defined in claim 1 wherein said tubular frame includes two pairs of vertically spaced opposed mounting plates, each pair of which is pivotally secured at its medial portions to the outer end portion of one of said tubular sections, each pair of said mounting plates being pivotally mounted on said transverse frame in supported relation for free pivotal movement about a vertical axis; and (i) a pair of mounting brackets, one each of which is pivotally mounted on one of said pairs of opposed mounting plates for free movement about a vertical axis;

(j) each of said mounting brackets have a pair of depending mounting ears pivotally supporting the inner end portion of one of said harrow-gangs;

(k) each of said mounting brackets also including an upwardly and outwardly extending mounting arm, said arm being pivotally connected to one of said cylinders and supporting the same.

8. A levee plow comprising:

(a) a harrow-gang-supporting tubular frame constructed and arranged to be connected to and supported by a tractor to extend transversely thereof and to be moved thereby between gang-elevating non-operative position and gang-lowering operative position;

(b) said tubular frame including a pair of telescoping tubular sections;

(c) mechanical means extending between and connected to each of said tubular sections and being constructed and arranged to controllably move the same telescopically with respect to each other to extend and contract said frame; said mechanical means comprising an extensible linkage extending parallel to said tubular frame sections with one end of said linkage mounted on an exterior surface of one of said tubular frame sections and the other end of said linkage mounted on an exterior surface of the other one of said tubular frame sections;

(d) a pair of laterally spaced harrow gangs each having inner and outer end portions and being pivotally mounted about a vertical axis adjacent its inner portions upon one of said tubular frame sections for lateral movement of said axes toward and away from each other with said tubular sections, as the latter are so telescopically moved;

(e) the harrows of each of said gangs being arranged to move the soil traversed thereby laterally toward the other of said gangs;

(f) a pair of hydraulic cylinders constructed and arranged to be powered by the tractor when said frame is so connected, one each of said cylinders being pivotally connected at one of its ends to one of said tubular frame sections and at its other end of the extreme outer end portion of one of said gang harrows;

(g) said cylinders being constructed and arranged to be controlled from the tractor when connected thereto, and being connected in series fluid-power relation with each other;

(h) said cylinders being constructed and arranged so that when extended they will each force and hold the outer end portion of its associated gang harrow at a substantially lower elevation than its inner end portion while said gangs are in operative ground-engaging position.

9. The structure defined in claim 8 wherein said cylinders are also constructed and arranged to force and hold the outer end portions of each of said gangs in an elevated position relative to its inner end portion while said gangs are in operative ground-engaging positions.

10. The structure defined in claim 8 wherein said mechanical means comprises threaded adjustment mechanism extending between said tubular frame sections and connected thereto and causing the same to telescope relative to each other and thereby move said harrow-gangs toward or away from each other as said threaded mechanism is adjusted.

11. The structure defined in claim 8 wherein said frame is constructed and arranged to be pivotally connected in supported relation at each of its ends to such a tractor.

12. The structure defined in claim 8 wherein each of said harrow-gangs is pivotally mounted upon said frame at a point a substantial distance outwardly from the extreme inner end of said gang.

13. The structure defined in claim 8 wherein the pivotal mounting of each of said cylinders upon said frame includes a mounting arm extending upwardly and outwardly from said frame and to the outer end portion of which the inner end of said cylinder is pivotally connected, and also includes a depending pivotal connection to its associated harrow-gang at a point a substantial distance outwardly of the extreme inner end of said harrow-gang.

14. A levee plow comprising:
   (a) a longitudinally extensible harrow-gang-supporting frame having at least a pair of sections movable relative to each other to lengthen and shorten said frame and being constructed and arranged to be connected to and supported by a tractor to extend transversely thereof and to be moved thereby between gang-elevating non-operative position and gang-lowering operative position;
   (b) a pair of laterally spaced harrow-gangs each having inner and outer end portions and being pivotally mounted on said frame adjacent its inner end portion for pivotal movement relative to said frame about a generally horizontal axis extending transversely of said frame, said gangs extending rearwardly and laterally outwardly from said axis;
   (c) the harrows of each of said gangs being arranged to move the soil traversed thereby laterally toward the other of said gangs;
   (d) controllable power means pivotally mounted on said frame and pivotally connected to the outer end portions of said harrow-gangs;
   (e) said power means being constructed and arranged to be controlled from the tractor when said frame is so connected thereto;
   (f) said power means being constructed and arranged to move the outer end portions of said gangs vertically and to force and hold the outer end portions of each of said gangs at a substantially lower elevation than its inner end portion, when so desired; and
   (g) mechanical means constructed and arranged to extend between said frame sections to controllaby move the same with respect to each other and comprising an extensible linkage extending parallel to said frame with one end of said linkage mounted on an exterior surface of one of said frame sections and the other end of said linkage mounted on an exterior surface of the other one of said frame sections.

15. The structure defined in claim 14 wherein said power means includes a pair of hydraulic cylinders one each of which is connected to said frame and extends outwardly to the outer end portion of each one of said harrow gangs.

16. The structure defined in claim 14 wherein said power means includes a pair of hydraulic cylinders powered by the tractor when so connected and one each of which is connected to said frame and extends outwardly to the outer end portion of each one of said harrow gangs, and each of said cylinders is connected in series fluid-power relation with the other.

17. The structure defined in claim 14 wherein said power means is also constructed and arranged to force and hold the outer end portions of each of said gangs in an elevated position relative to its inner end portion while said gangs are in operative ground-engaging position.

* * * * *

UNITED STATES PATENT AND TRADEMARK OFFICE
CERTIFICATE OF CORRECTION

PATENT NO. : 4,484,636

DATED : November 27, 1984

INVENTOR(S) : Emory R. Hodgson, Jr.

It is certified that error appears in the above-identified patent and that said Letters Patent are hereby corrected as shown below:

Column 1, line 37, after "of" delete "some" and insert --same--

Signed and Sealed this

Sixth Day of August 1985

[SEAL]

Attest:

DONALD J. QUIGG

Attesting Officer

Acting Commissioner of Patents and Trademarks